June 8, 1937. A. W. TYE 2,082,920
TRAILER
Filed Dec. 24, 1935 2 Sheets-Sheet 2
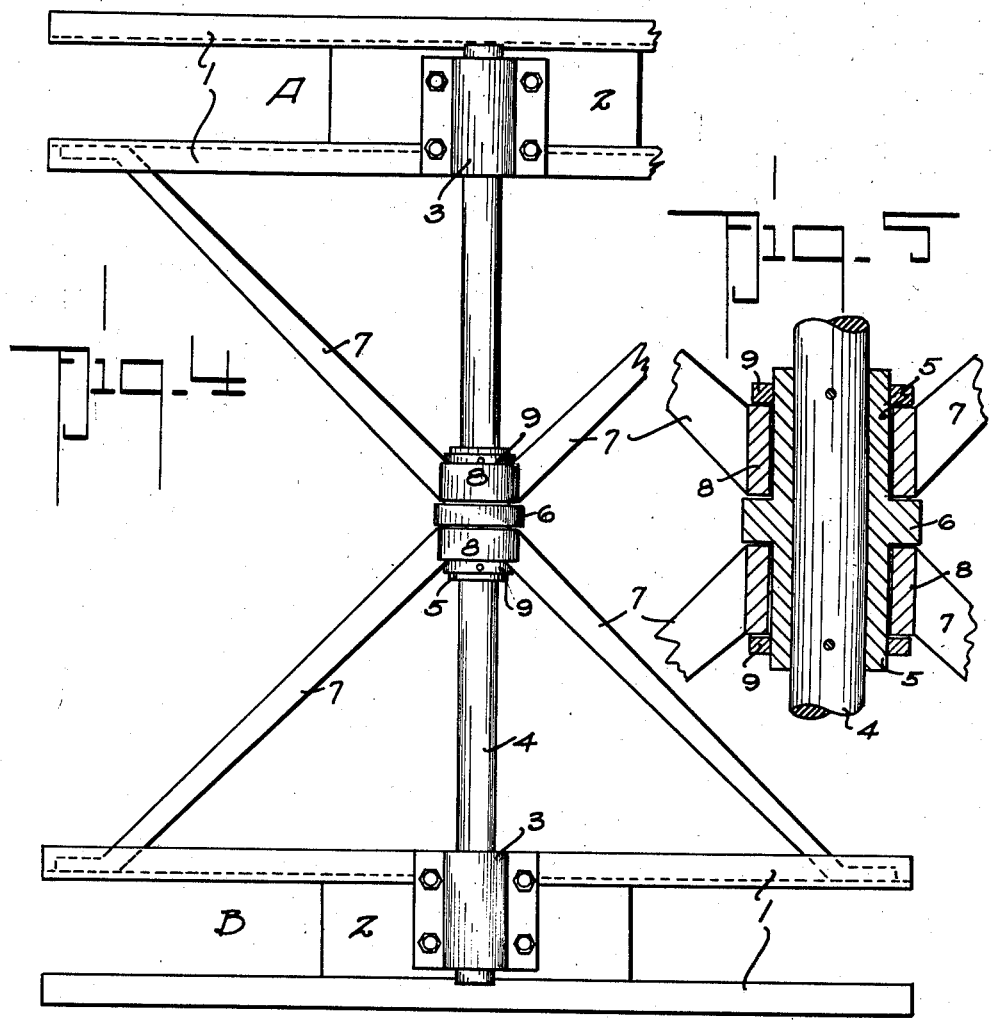
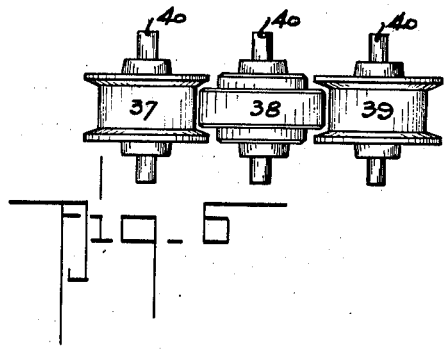
Aulmont W. Tye
*Inventor*
By Herbert E. Smith
*Attorney*

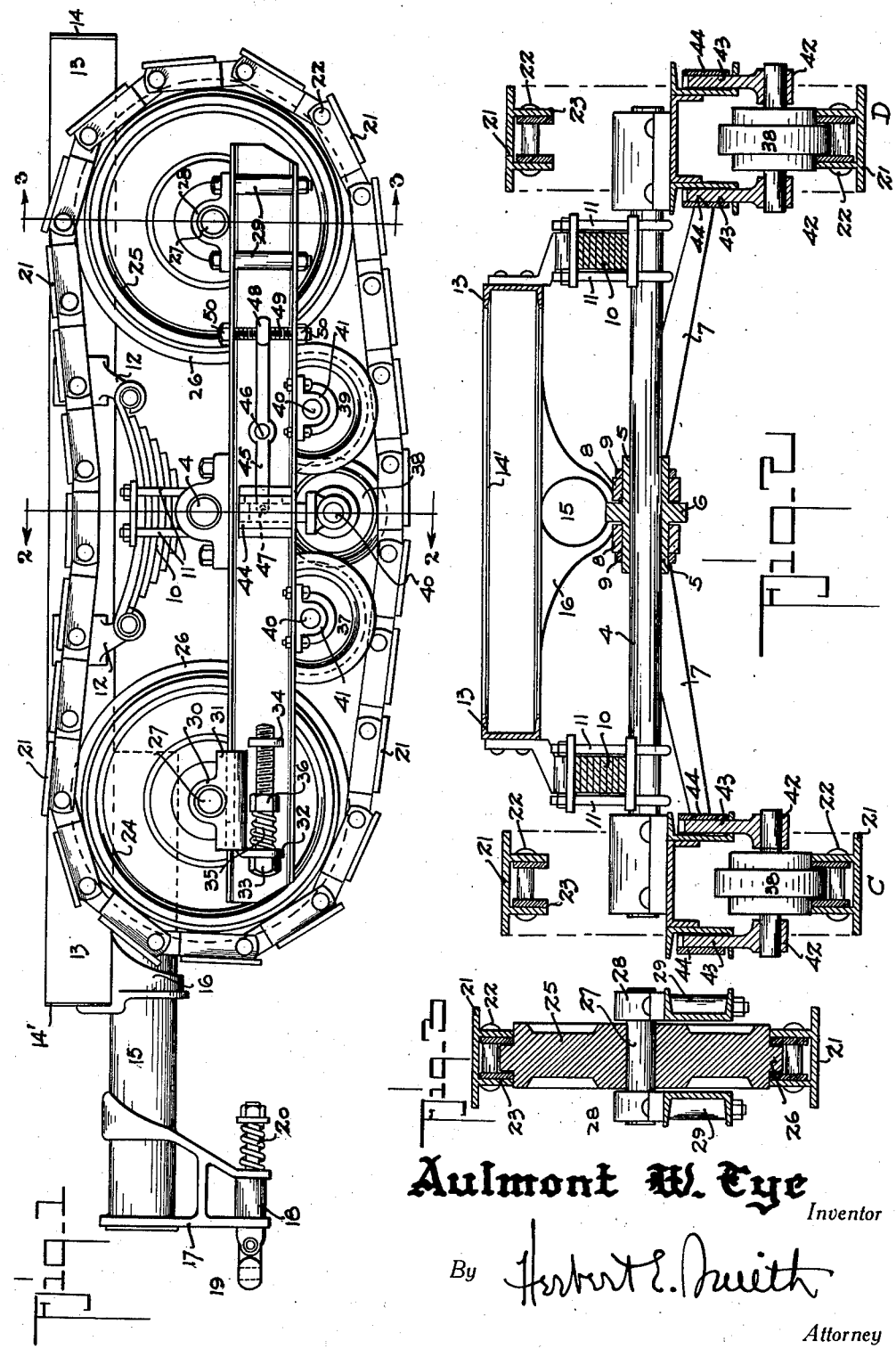

Patented June 8, 1937

2,082,920

UNITED STATES PATENT OFFICE 2,082,920

TRAILER

Aulmont W. Tye, Spokane, Wash.

Application December 24, 1935, Serial No. 56,073

2 Claims. (Cl. 305—9)

My present invention relates to improvements in trailers or heavy-duty trucking vehicles having traction apparatus involving portable, endless, flexible tracks, in lieu of the usual supporting wheels for this type of land vehicle. The trailer of my invention is adapted to be towed by an automotive truck or tractor, and the trailer is especially designed for transporting heavy loads over irregular or rough surfaces, as well as over smooth roads or highways.

In carrying out my invention I provide a heavy duty trailer capable of smooth and easy running, and especially facile in the movements required in making short turns, or pivotal movements, as the trailer follows the track of the towing vehicle in rounding curves, avoiding obstructions, etc. By the combinations and arrangements of parts involving the body frame and the wheel frames, a single axis is provided at substantially the longitudinal center of the vehicle to permit pivotal movement of the body frame with relation to the wheel frames, and also to permit independent pivotal movements of the two wheel frames with relation to the body frame, these movements being on a horizontal axis, or main axle. Means are also provided whereby the trailer may readily pivot, as when making turns, on a vertical axis; and the center of gravity of the vehicle or trailer is located at a low point in line with the horizontal and vertical axes.

The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is a view in side elevation, showing a trailer constructed in accordance with my invention.

Figure 2 is a transverse vertical sectional view at line 2—2 of Figure 1, at the center of the trailer, showing the body frame, a wheel frame, and main axle together with portions of the pivotal center wheels, and endless tracks.

Figure 3 is a transverse vertical sectional view at line 3—3 of Figure 1, showing one of the main guide wheels or supporting wheels for a track, and showing the relation of the flexible track to the wheel.

Figure 4 is a plan view of a portion of the wheel frame or under frame of the trailer.

Figure 5 is an enlarged horizontal sectional view showing the bearings on the main axle, at the longitudinal and transverse center of the trailer, for the respective wheel frames of the under frame.

Figure 6 is a detail plan view of one set of compactly arranged intermediate traction wheels for the tracks.

The under frame as a whole includes two separate and independent wheel frames A and B, and each of the wheel frames includes a pair of spaced channel bars 1, 1, rigidly joined in pairs, and the pairs are located at opposite sides of the trailer. At the longitudinal center of the wheel frames a bearing plate 2 joins the channel bars 1, and bearings 3 are mounted on top of the wheel frames for the main axle 4 that extends transversely of the trailer. At the longitudinal center of the axle a bushing 5 is mounted thereon, and this bushing is fashioned with an exterior, central, annular flange 6, to provide a spacing element between the laterally disposed wheel frames, each of which frames includes a pair of radius bars or diagonal braces, 7, 7, and 7, 7. The outer ends of these radius bars, in front of, and at the rear, of the axle 4, are rigidly bolted or riveted to the respective inner members of the wheel frames, and the inner converging ends of these radius bars, in pairs, are rigidly secured each to a hub 8 that surrounds the bushing, and one of these hubs is located at each side of the spacing flange 6 of the bushing. Retaining collars 9 are pinned on the bushing and to the axle, and these collars, one at each end of the bushing, together with the spacing flange 6, prevent excessive lateral play of the wheel frames on the axle. Thus it will be apparent that each wheel frame of the under frame is supported beneath the axle by means of a bearing 3 and a hub 8, and these two widely spaced bearings for each wheel frame permit the respective frames to rock on the bushing and shaft, in vertical planes and on a single horizontal axis.

A rectangular body frame is supported above the underframe and axle, and between the pairs of channel bars of the wheel frames, by means of a pair of semi-elliptic leaf springs 10, 10, extending longitudinally of the trailer, and these springs are mounted on the axle by U-bolts 11, and the usual saddle plates and nuts. The front and rear ends of each spring are flexibly joined with the body frame through the use of shackles 12 bolted to the outer sides of the body frame.

The rectangular body frame includes a pair of spaced channel beams 13, 13, one at each side of the longitudinal center of the trailer, and the two transverse end plates 14, 14', rigidly join these side plates or beams, and the front end plate 14' forms a bolster for the tubular or cylindrical draw-bar 15 that is mounted in the draw-head 16 rigid with the bolster. The draw-bar projects in front of the trailer, at its longitudinal center, and a coupling head and yoke 17 are rigidly mounted on the front end of the projecting draw bar. The coupling head is fashioned with a holder or cylindrical guide 18 for the coupling bolt 19 that extends through the holder, and a spring 20 mounted on the bolt at the rear of the holder, provides a resilient backing for the coupling bolt under strains of towing.

The two portable, endless, flexible, tracks, each as a whole, are indicated as C and D, each one being mounted on a wheel frame, and at opposite sides of the trailer. The endless tracks are made up of tread-links 21, pivoted together as at 22, and the spaced flanges 23 of the tread-links provide the ways or tracks that are supported on the two supporting and guide wheels 24 and 25 at the front and rear of the trailer, respectively.

As indicated in Figure 3 these guide and supporting wheels 24 and 25 each have a wide rim and a central annular exterior flange 26 around which the endless flexible tracks pass and the latter are retained against lateral displacement by these annular flanges. Each of the large wheels is provided with a stud-shaft 27, the shafts of the two laterally spaced rear wheels being journaled in bearings 28 located on the top of the under frame, and secured thereon by pedestal bolts 29. The front wheels 24 are adjustable longitudinally of the trailer for the purpose of taking up or compensating for wear in the pivots of the endless tracks, and for varying the tension of the tracks. For this purpose the bearings 30 of the front shafts 27 are mounted in slide blocks 31, adjustable on the wheel frames, and each of these slide bearing blocks has a front depending flange 32 in which an adjusting bolt 33 is mounted to turn, the rear end of the bolt being threaded through a fixed nut 34 rigid with the wheel frame or one of the channel beams 1. A tension spring 35 is coiled about the bolt and interposed between the rear face of the flange 32 and an adjusting or tension nut 36 threaded on the bolt between the flange 32 and the fixed nut 34. By turning the bolt the slide bearing may be adjusted on the beam 1, and by turning the nut 36 on the bolt the tension of the spring may be varied to adjust the resiliency of the spring, which spring, of course, tends to move the slide bearing forward.

In each wheel frame is mounted a set of three comparatively small wheels 37, 38, and 39, located at the center of the trailer intermediate of the two supporting wheels 24 and 25, and designed as traction wheels to bear the major portion of the load imposed on the endless flexible tracks.

In Figure 6 it will be noted that the rollers 37 and 39 have side flanges, while the intermediate roller 38 has a comparatively broad central annular flange of the proper width to fit in between the flanges of the respective front and rear rollers 37 and 39, thus permitting of a close association to the three rollers at the center of the track. The flanged rollers 37 and 39 straddle the working flight of the track, while the central roller with its tread flange as indicated in Figure 2, fits in between the flanges 23 of the tracks, so that the tread-links of the working flight bearing the load beneath these rollers are held in alinement against lateral spreading, as well as against inward bending of their flanges 23.

These rollers are each provided with a stud shaft, as 40, the front and rear rollers having bearings 41 for their shafts fixed at the underside of the under frame, while the bearing for the shaft of roller 38 is vertically adjustable in line with the main axle 4 and the longitudinal center of the spring 10. As indicated in Figure 2 the bearings 42, one at each side of a roller, are supported from pedestal pins 43 which are housed in guides 44 secured to outer faces of the channel beams of the wheel frames, the pedestal pins being alined with the axle and the center of the leaf springs 4. Each bearing is provided with an adjusting lever 45 pivoted at 46 to one of the channel beams of the wheel frame, with the front end of a lever passing through a hole in the housing and engaging in a socket of a pedestal pin, as at 47. The rear end of the lever is fashioned with a threaded nut or threaded eye 48 through which a perpendicular bolt 49 extends, and the ends of the bolt project vertically through alined holes in the flanges of the channel beam 1 of the wheel frame, locking nuts 50 being provided on the bolt exterior of the flanges. By turning the bolt the nut-end of the lever is raised or lowered to depress or to elevate the center roller of the set of three rollers. Normally, the center roller 38 is depressed so that its lower tread portion is below the tread portions of the two outer rollers 37 and 39, and the tread portions of the intermediate rollers are below the lower periphery of the two supporting wheels 24 and 25.

Due to this arrangement of the wheels and rollers, the working flight or ground-engaging flight of the endless track rises to the front and rear from the center roller 38, and the upwardly inclined track portion at the front of the center roller is thus adapted to ride smoothly over irregularities in the surface over which the trailer is traveling. The tread-link directly below the center roller 38 also adapts itself as a pivotal center for a wheel frame when the trailer is swinging to right or to left. The angular arrangement of the working flight of the endless track also reduces the area of the working flight in contact with the ground surface, thus reducing the frictional area and thereby more readily permit a pivotal movement of the wheel frame on the tread-link below roller 38 as a center. The center roller 38 with the single annular flange at its center, and the two outer rollers 37 and 39, with their spaced lateral flanges, are especially effective in holding the track in alinement, and against lateral twisting strains, when the trailer is swinging or turning on the tread-links below the roller 38.

As indicated in Figure 2, the two wheel frames are free to rock or swing on their horizontal axes, independently of one another, and therefore the differential movement required for a short turn is facilitated, and the outer wheel frame may swing freely over the ground surface with a tread-link of the inner wheel frame acting as the pivotal point.

By this arrangement of parts, the center of gravity of the unloaded trailer is normally in line with the longitudinal center of the spring 10, the shaft 4, and the shaft 40 of the center wheel or roller 38, and just above the ground surface, and of course the load, when placed on the trailer, is equally distributed to preserve the symmetry of the trailer, and to maintain the angularity of the working flights of the two tracks.

Having thus fully described my invention, what I claim as new and desire to secure by Letters Patent is:—

1. In a vehicle of the portable, endless, flexible track type, the combination with a wheel frame, of a pair of spaced track-engaging rollers each having a pair of lateral flanges, a center roller having a single flange, fixed bearings for the spaced rollers, an adjustable bearing for the center roller including a lever operatively connected with said adjustable bearing and fulcrumed on said wheel frame.

2. In a vehicle of the portable, endless, flexible track type, the combination with a wheel frame, of a pair of spaced track-engaging rollers each having a pair of lateral flanges, a center roller having a single flange, fixed bearings for the spaced rollers, an adjustable bearing for the center roller, a horizontally disposed lever pivotally mounted on the frame and having one end operatively connected with the adjustable bearing, a threaded nut rigid with the other end of the lever, and a bolt mounted on the frame and threaded through the nut for raising and lowering the ends of the lever.

AULMONT W. TYE.